(12) United States Patent
Preller

(10) Patent No.: US 6,314,003 B2
(45) Date of Patent: Nov. 6, 2001

(54) SWITCHED-MODE POWER SUPPLY

(75) Inventor: Peter Preller, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/789,344

(22) Filed: Feb. 20, 2001

Related U.S. Application Data

(63) Continuation of application No. PCT/DE99/02538, filed on Aug. 13, 1999.

(30) Foreign Application Priority Data

Aug. 20, 1998 (DE) .............................. 198 37 919

(51) Int. Cl.⁷ .............................................. H02M 3/335
(52) U.S. Cl. ........................... 363/21.04; 363/97; 363/49
(58) Field of Search ........................... 363/16, 20, 21.04, 363/21.08, 97, 131, 49

(56) References Cited

U.S. PATENT DOCUMENTS

| | | | |
|---|---|---|---|
| 3,935,526 | * 1/1976 | Kamata et al. | 363/21.04 |
| 4,694,386 | * 9/1987 | de Sartre | 363/49 |
| 4,695,936 | * 9/1987 | Whittle | 363/49 |
| 4,885,673 | * 12/1989 | Philippe | 363/97 |
| 4,912,617 | * 3/1990 | Hartmann et al. | 363/67 |

* cited by examiner

Primary Examiner—Peter S. Wong
Assistant Examiner—Gary L. Laxton
(74) Attorney, Agent, or Firm—Herbert L. Lerner; Laurence A. Greenberg; Werner H. Stemer

(57) ABSTRACT

The invention relates to a switched mode power supply, whereby the number of components is reduced to a considerable extent in comparison with conventional switched mode power supplies. The switching transistor of the switched mode power supply is controlled by a processor on the secondary side of said switched mode power supply. Control thereof is determined by the software of the processor and can be slightly modified and adapted. The required processor functions can be taken over by a processor that is already contained in the device which is powered by the switched mode power supply.

5 Claims, 1 Drawing Sheet

SWITCHED-MODE POWER SUPPLY

CROSS-REFERENCE TO RELATED APPLICATION

This application is a continuation of copending International Application No. PCT/DE99/02538, filed Aug. 13, 1999, which designated the United States.

BACKGROUND OF THE INVENTION

FIELD OF THE INVENTION

The invention relates to a switched-mode power supply having a rectifier configuration which supplies a rectified voltage at its output, a transformer with a primary winding and a secondary winding for connecting a load, a switching transistor for the clocked application of the rectified voltage to the primary winding, and a drive unit which controls the switching transistor.

In switched-mode power supplies the current flowing through the primary winding of the switched-mode power supply transformer is chopped by means of the switching transistor. The voltage pulses induced on the secondary side of the transformer are rectified and smoothed in order to supply a load with the D.C. voltage. The turn-on and turn-off phases of the switching transistor are controlled in dependence on the loading in such a way that the secondary voltage is regulated to be constant and as far as possible independent of load.

A power supply of the generic type is disclosed, for example, in my earlier, commonly assigned U.S. Pat. No. 5,420,776. The control unit there contains an integrated circuit designated TDA 4605 which, for the purpose of supplying the operating voltage, is connected via voltage dividers with a bridge rectifier. The latter rectifies the input A.C. voltage. The output of the control unit is connected to the control terminal of the switching transistor which is coupled with the primary winding. The withstand voltage of the control unit must thereby be chosen in dependence on the strength input A.C. voltage.

FIG. 3 of published PCT application Wo 97/50165 discloses a switched-mode power supply which has a rectifier configuration at the output of which a rectified voltage is available which, by means of a switching transistor, is applied to a primary winding belonging to a transformer and connected in series with the switching transistor. A drive circuit of the switching transistor is coupled to the secondary coil in that prior art switched-mode power supply, and is connected to a control terminal of the switching transistor by means of a transformer.

Published PCT application WO 98/03136 discloses a switched-mode power supply in which a D.C. voltage which is available is applied by means of a switching transistor to a primary winding belonging to a transformer and connected in series with the switching transformer. In order to drive the switching transistor, a pulse generator is provided, which is coupled to the control connection of the switching transistor by means of a transformer. In that case, the pulse generator is connected to a secondary coil of the transformer. In order to permit the switched-mode power supply to be started up, a start circuit configuration is provided on the primary side, which picks up energy from the D.C. voltage that is present on the primary side and which is connected to the control terminal of the switching transistor.

SUMMARY OF THE INVENTION

The object of the present invention is to provide a switched mode power supply which overcomes the above-noted deficiencies and disadvantages of the prior art devices and methods of this general kind, and which is simplified in terms of its circuitry on the primary side.

With the above and other objects in view there is provided, in accordance with the invention, a switched-mode power supply, comprising:
  a rectifier configuration having an output supplying a rectified voltage;
  a transformer having a primary winding connected to the rectifier configuration and a secondary winding;
  a switching transistor connected to the primary winding for a clocked application of the rectified voltage to the primary winding;
  a drive unit for driving the switching transistor, the drive unit being coupled to the secondary winding and being D.C.-isolated from the switching transistor; and
  a voltage source connected on a secondary side of the transformer for providing an operating voltage to the drive unit during a startup of the switched-mode power supply.

In accordance with an added feature of the invention, the drive unit is connected to the switching transistor via a further transformer.

In accordance with an additional feature of the invention, the drive unit is D.C.-connected to the secondary winding.

In accordance with a concomitant feature of the invention, the voltage source is a rechargeable battery or an electrolytic capacitor.

The invention has the advantage that commercial microprocessors can be used for driving the switching transistor. The drive unit does not have to be designed for the mains voltage; instead it can be designed for the lower voltage on the secondary side.

The driving function of the microprocessor can be undertaken by a processor which is already present in the device to be supplied with power by the switched-mode power supply, for example the deflection processor in television sets.

Driving the switching transistor by means of the microprocessor is very flexible and, by changing the software, can be adapted with a relatively low outlay and even for relatively small numbers. Driving is preferably carried out digitally, but can also be carried out analog.

Since the entire control outlay on the primary side is dispensed with, the latter substantially only contains the power transistor, the bridge rectifier, the mains filter and, possibly, a current pump for the sinusoidal current uptake.

Mains-voltage monitoring, short-circuit disconnection and further special functions, such as burst operation in standby, can likewise be implemented as software.

Other features which are considered as characteristic for the invention are set forth in the appended claims.

Although the invention is illustrated and described herein as embodied in a switched-mode power supply, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
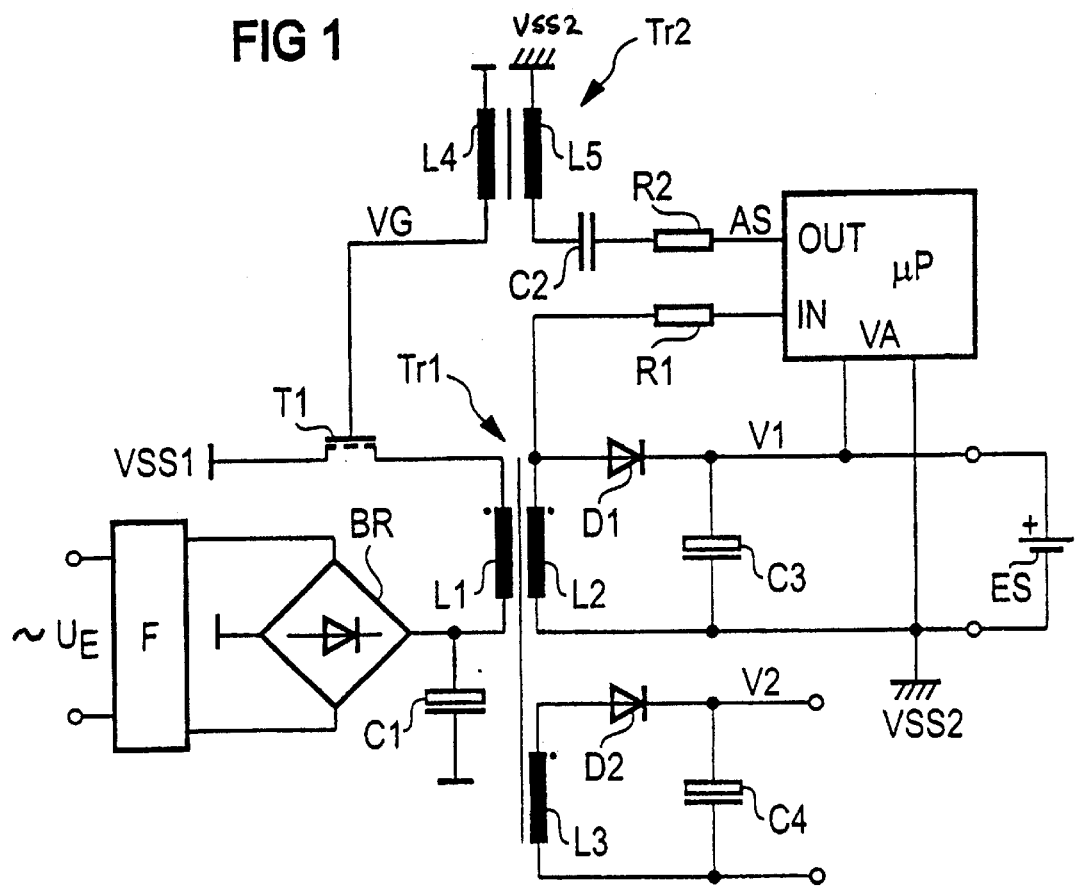
FIG. 1 is a schematic circuit diagram of a processor-controlled switched-mode power supply.

The invention is based on the principle of driving a switched-mode power supply on the secondary side, via a processor, rather than on the primary side. Referring now to the figures of the drawing in detail and first, particularly, to FIG. 1 thereof, there is seen a processor-controlled switched-mode power supply. A mains filter F, to which an input A.C. voltage $U_E$ can be fed, is connected to the input of a rectifier configuration BR. The rectifier configuration BR is normally a bridge rectifier. The output of the rectifier BR is connected to a primary winding L1 of a transformer Tr1. A primary capacitor C1 is connected between the output of the rectifier BR and a primary reference potential VSS1. A further connection of the primary winding L1 is connected to the primary reference potential VSS1 via the drain/source path of a switching transistor T1. On the secondary side there are a first secondary winding L2 and a second secondary winding L3 of the transformer Tr1. The second secondary winding L3 forms a series circuit with an output diode D2 and an output capacitor C4. An output voltage V2 can be tapped off via the output capacitor C4. The first secondary winding L2 likewise forms a series circuit with a supply diode D1 and a supply capacitor C3. A supply voltage V1 is dropped across the supply capacitor C3 and is fed to a processor $\mu P$. In the exemplary embodiment, a rechargeable battery ES is connected in parallel with the supply capacitor C3. The capacitors C3 and C4 in each case are used to smooth the voltages induced in the windings L2 and L3 on the secondary side.

The anode connection of the supply diode D1 forms a common node with a connection of the first secondary winding L2 and a first resistor R1. Via this node, the first resistor R1 is connected to an input connection IN of the processor $\mu P$. An output connection OUT of the processor $\mu P$ is connected to a secondary reference potential VSS2 via a series circuit comprising a secondary resistor R2, a series capacitor C2 and a first winding L5 of a transformer Tr2. The primary reference potential VSS1 is connected to the control electrode of the switching transistor T1 via a second winding L4 of the transformer Tr2. Across the second winding L4 of the transformer Tr2 there is a drive voltage VG.

The input filter F, the bridge rectifier BR, the primary capacitor C1 and the switching transistor T1 form the primary side of the switched-mode power supply. The secondary side is formed by the processor $\mu P$, the first and second resistor R1, R2, the series capacitor C2 and the two output circuits, each having a secondary winding of the transformer Tr1. The transformer Tr1 and the transformer Tr2 are located between the primary and secondary sides.

The supply voltage V1 across the supply capacitor C3 is tapped by the processor $\mu P$ via supply terminals VA. One terminal of the supply connections VA is connected to the secondary reference potential VSS2. The processor evaluates the supply voltage V1 and, at its output OUT, outputs a pulse-like output signal AS on the basis of this voltage V1. That signal is fed via the second resistor R2 and the series capacitor C2 to the first winding L5 of the transformer Tr2. In the second winding L4 of the transformer Tr2, pulses are accordingly induced and are passed on to the control electrode of the switching transistor T1. In accordance with these pulses, the switching transistor T1 is turned on and off. On the basis of the changes in the magnetic flux, in each case a voltage is induced in the secondary windings L2, L3. The voltage induced in the first secondary winding L2, reduced by the voltage drop across the supply diode D1, is present as a supply voltage V1 on the supply connections VA of the processor $\mu P$. The latter therefore regulates its supply voltage V1 via the path comprising transformer Tr2, switching transistor T1 and transformer Tr1. It is likewise possible to regulate a different output voltage than V1, if this voltage is fed to the processor $\mu P$ via a voltage divider. Because of the magnetic coupling of the secondary windings L2 and L3, a voltage across a load, which is connected in parallel with the capacitor C4, is also regulated.

The transformer Tr2 replaces the optocoupler, which is otherwise usual in the feedback path in switched-mode power supplies, for the D.C. isolation of primary and secondary side. In addition, it ensures transformation of the pulse-like output signals AS from the processor $\mu P$, which have a peak value of 3.3 V or 5 V, for example, to the higher voltage of the pulses VG, which are 12 V, for example. The transformer Tr2 ensures that the switching transistor T1 is driven with a higher voltage than that supplied by the processor $\mu P$.

In order that the current cannot exceed the saturation limit in the second winding L5 of the transformer Tr2, the series circuit comprising the second resistor R2 and the series capacitor C2 is connected between the input of the winding L5 and the output OUT of the processor $\mu P$. Depending on the duty factor of the pulse-like output signals AS, a corresponding D.C. voltage level of the drive signal VG is then established.

Figure 2:
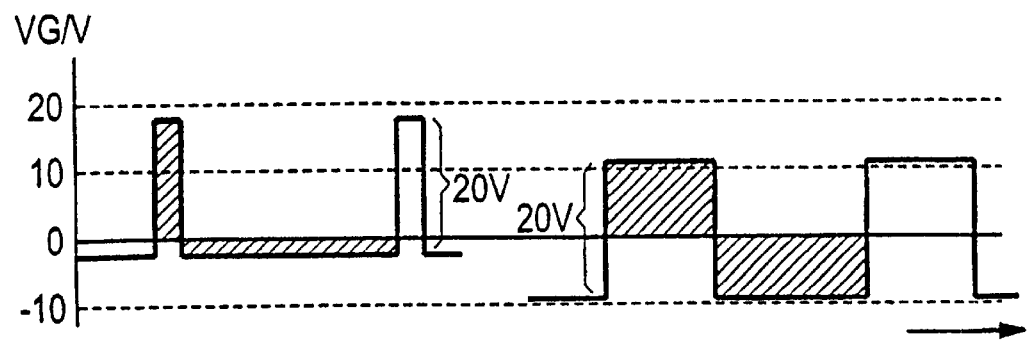
FIG. 2 is a graph showing the variation of the drive voltage VG under different loads.

Referring now to FIG. 2, there is shown the voltage waveform for a very low and a very high output power from the switched-mode power supply. The coherent, hatched areas are voltage-time products. The area of the left-hand hatched areas is approximately equal to the area of the right-hand hatched areas. The drive signals VG lie in the right-hand voltage range when the ratio between the lowest possible (left-hand pulse waveform in FIG. 2) and the highest possible (right-hand pulse waveform) voltage of the drive signals is about 2. In the exemplary embodiment, the lowest and the highest voltage of the drive signal VG are approximately between 10 V and 20 V. The duty factors of the drive signals VG in switched-mode power supplies normally are between 0% and 50%.

The drive power which the processor $\mu P$ must apply in order to drive the switching transistor T1 via the transformer Tr2 is not substantially higher than the power which is needed to drive the switching transistor T1 directly without any transformer, since the transformer has a high efficiency. The drive power of the switching transistor, for example a power MOSFET, is given by the periodic charge reversal of its gate capacitance. If, for example, the gate capacitance is 1 nF and the voltage of the drive signal is 12 V, and if the switching frequency of the switching transistor T1 is about 50 kHz, then the drive power is about $0.5*1$ nF$*(12$ V$)^2*50$ kHz=3.6 mW. This low drive power is provided, for example, by an integrated driver stage of the processor $\mu P$. Recently introduced, so-called cool-MOS power transistors exhibit only about 1/5 of the gate capacitance with the same turn-on resistance as conventional SIPMOS transistors.

Even the startup of the switched-mode power supply must take place from the secondary side, since there is no longer any circuitry on the primary side. There are a number of possibilities of providing the operating voltage for the processor $\mu P$ on the secondary side. The energy for the first startup of the switched-mode power supply, that is to say if no voltage has yet been induced on the secondary side by the transformer Tr1, can be made available by the voltage source ES, which may be a rechargeable battery, an appropriately large electrolytic capacitor, which is protected from being discharged in standby operation by regular switching pulses, or by a standby power supply unit which may possibly already be present. Since, before a device is switched on for the first time, an electrolytic capacitor is completely empty and the power supply unit could not start up, a coil coupled to the mains switch of the device would be expedient, in which coil, when the switch is operated, a sufficiently high voltage for the startup is induced. The advantage would be that, when the mains plus of the device is plugged in with the main switch already switched on, the device cannot switch itself on.

Even mains-voltage monitoring can be carried out on the secondary side. When the switching transistor T1 is turned on, a negative voltage is induced in the first secondary winding L2 of the transformer Tr1. This voltage is proportional to the voltage across the primary capacitor C1. Mains voltages, under voltages or over voltages are registered, and appropriate control measures are initiated by the processor $\mu P$.

The processor $\mu P$ also performs monitoring for a secondary short circuit. It is supplied with the comparison voltage V1 via the supply connections VA. At the input connection IN, the processor $\mu P$ is supplied with the zero crossings of the transformer Tr1 via the first resistor R1. These zero crossings are also evaluated in the event of a short circuit, and in this way oversaturation of the transformer Tr1 and destruction of components is prevented. The processor $\mu P$ then outputs appropriate signals to turn off the switching transistor T1.

The switched-mode power supply according to the invention can be constructed more cost-effectively as compared with conventional switched-mode power supplies and, at the same time, can be employed more flexibly with regard to its special functions. Since the special functions are implemented in software, different control specifications can be achieved with a single circuit construction.

In the event of damage occurring, the switched-mode power supply can be checked very simply, by a pulse generator being connected to the control electrode of the switching transistor T1 and the connection to the transformer Tr2 being broken. It is then possible to establish whether the fault is located in the switched-mode power supply itself, on the secondary side or in the processor.

I claim:

1. A switched-mode power supply, comprising:

a rectifier configuration having an output supplying a rectified voltage;

a transformer having a primary winding connected to said rectifier configuration and a secondary winding;

a switching transistor connected to said primary winding for a clocked application of the rectified voltage to said primary winding;

a drive unit for driving said switching transistor, said drive unit being coupled to said secondary winding and being D.C.-isolated from said switching transistor; and a voltage source connected on a secondary side of said transformer for providing an operating voltage to said drive unit during a startup of the switched-mode power supply.

2. The switched-mode power supply according to claim 1, which comprises a further transformer connected between said drive unit and said switching transistor.

3. The switched-mode power supply according to claim 1, wherein said drive unit is D.C.-connected to said secondary winding.

4. The switched-mode power supply according to claim 1, wherein said voltage source is a rechargeable battery.

5. The switched-mode power supply according to claim 1, wherein said voltage source is an electrolytic capacitor.

* * * * *